United States Patent [19]

Joyner

[11] 4,153,260
[45] May 8, 1979

[54] SLIP SPLINE SEAL ASSEMBLY

[75] Inventor: Robert G. Joyner, Toledo, Ohio

[73] Assignee: Dana Corporation, Toledo, Ohio

[21] Appl. No.: 911,927

[22] Filed: Jun. 2, 1978

[51] Int. Cl.² ............................................. F16J 15/56
[52] U.S. Cl. .................................... 277/181; 277/215; 403/359; 64/23
[58] Field of Search .............................. 277/180–186, 277/215; 403/359; 64/23

[56] References Cited

U.S. PATENT DOCUMENTS

| | | | |
|---|---|---|---|
| 2,994,571 | 8/1961 | Peras | 277/181 X |
| 3,197,216 | 7/1965 | Jackson | 403/359 X |
| 3,227,985 | 1/1966 | Hardison et al. | 403/359 X |
| 3,508,418 | 4/1970 | Jones | 64/23 |
| 3,885,802 | 5/1975 | Wheeler | 277/215 X |
| 3,913,924 | 10/1975 | Barefoot et al. | 277/181 X |

FOREIGN PATENT DOCUMENTS 2739686  3/1978  Fed. Rep. of Germany .......... 403/359

Primary Examiner—Robert S. Ward, Jr.
Attorney, Agent, or Firm—Richard D. Emch; Robert M. Leonardi

[57] ABSTRACT

The present invention is a slip spline seal assembly for sealing the ends of a splined shaft and complementary sleeve. The assembly includes a flexible body having alternating projections and intervals for meshing engagement with the spline shaft. Recesses are located on the sealing surfaces of the flexible body to provide pockets for lubricating medium and reliefs for displacement of body material when it is compressed, thereby decreasing wear and tear and promoting a longer useful life of such seal assemblies. The assembly also includes means for locking engagement with the complementary sleeve, and for completing the sealing of the spline connection between the shaft and the sleeve.

8 Claims, 10 Drawing Figures

SLIP SPLINE SEAL ASSEMBLY

BACKGROUND OF THE INVENTION

The present invention is a slip spline seal assembly for sealing the ends of a splined yoke shaft and complementary sleeve. Although suitable for the vehicular field, the invention has application with any spline type seal such as typically found in all types of drive shafts and in the machine tool industry.

Seal assemblies for spline shafts are known in the art. However, such assemblies suffer from their inability to be lubricated, especially along and about their sealing surfaces. This disadvantage is important with respect to seal assemblies made from compressible or flexible materials, since the lack of lubrication eventually results in deterioration of those materials. The spline projections or teeth on such assemblies then become susceptible to disintegration. The effects of disintegration are magnified with seal assemblies which are designed to seal the connection between a splined shaft and sleeve, and yet slip along the shaft with such sleeve. The slipping action, under those circumstances, causes the spline projections or teeth of the assembly to break off, thereby limiting their useful life and requiring frequent replacement of the assembly. The consequent loss in sealing ability further promotes wear of the splined shaft itself.

An additional disadvantage of the prior art assemblies, especially those designed for splined shaft and sleeve combinations, is their lack of a means for displacement of the flexible material when the flexible assembly projections are compressed. Consequently, the projections fit too tightly against the ribs of the shaft and are subject to additional excessive stress, wear and tear.

SUMMARY OF THE INVENTION

The present invention is a seal assembly which addresses and solves the disadvantages of the prior art set forth above. By its broadest definition, the invention comprises a flexible body having a row of alternating projections and intervals for splined and sealing engagement with the alternating longitudinal grooves and ribs of a spline shaft.

Each such interval has a base and lies between two opposing faces of adjacent projections, the base and the two opposing faces being primary sealing surfaces for abutment against the ribs of the shaft. At least one, and preferably each, of those sealing surfaces is recessed. Such recesses provide pockets for lubricating medium, thereby eliminating that problem of the prior art assemblies. Additionally, such recesses provide areas for displacement of the flexible material when the projections are compressed, such as occurs during fitting or slipping of the seal assembly on the spline shaft. Displacement in this manner prevents a stress build-up which is characteristic of compressed flat sealing surfaces. Still further, the recesses form each sealing surface into two separate points of contact, or seals, against each adjacent side of the longitudinal ribs of the shaft, thereby enabling a good seal to be maintained should only one point of contact fail.

Whereas, the above-described recesses provide relief from compression of the flexible projections in the longitudinal or axial direction of the shaft, similar relief is furnished by dimples in the diametrically opposed upper and lower sides of the assembly projections. Since those sides lie in a plane perpendicular to the axis of the shaft, the dimples therein provide primary relief from compression in the radial direction.

Where the assembly is to be used to seal the spline connection between a splined shaft and complementary sleeve, and also must slip along the shaft with the sleeve, the flexible body is seated within or manufactured integral with an outer cap having a cylindrical bore, such that the spline shaft meshes with the flexible body projections and passes through the cylindrical bore of the cap. The assembly also includes means for interlocking engagement with the sleeve.

It is, therefore, an object of the invention to provide an assembly for sealing a spline shaft.

It is also an object to provide a seal assembly for spline shafts which will be lubricated, thereby decreasing wear and tear on the seal.

It is further an object to provide a seal assembly for spline shafts which includes means for relieving stresses caused by compression of the projections or teeth of such assemblies.

Other objects and advantages will be obvious to persons skilled in the art from the following description of a preferred embodiment.

DETAILED DESCRIPTION OF THE INVENTION

Figure 1:
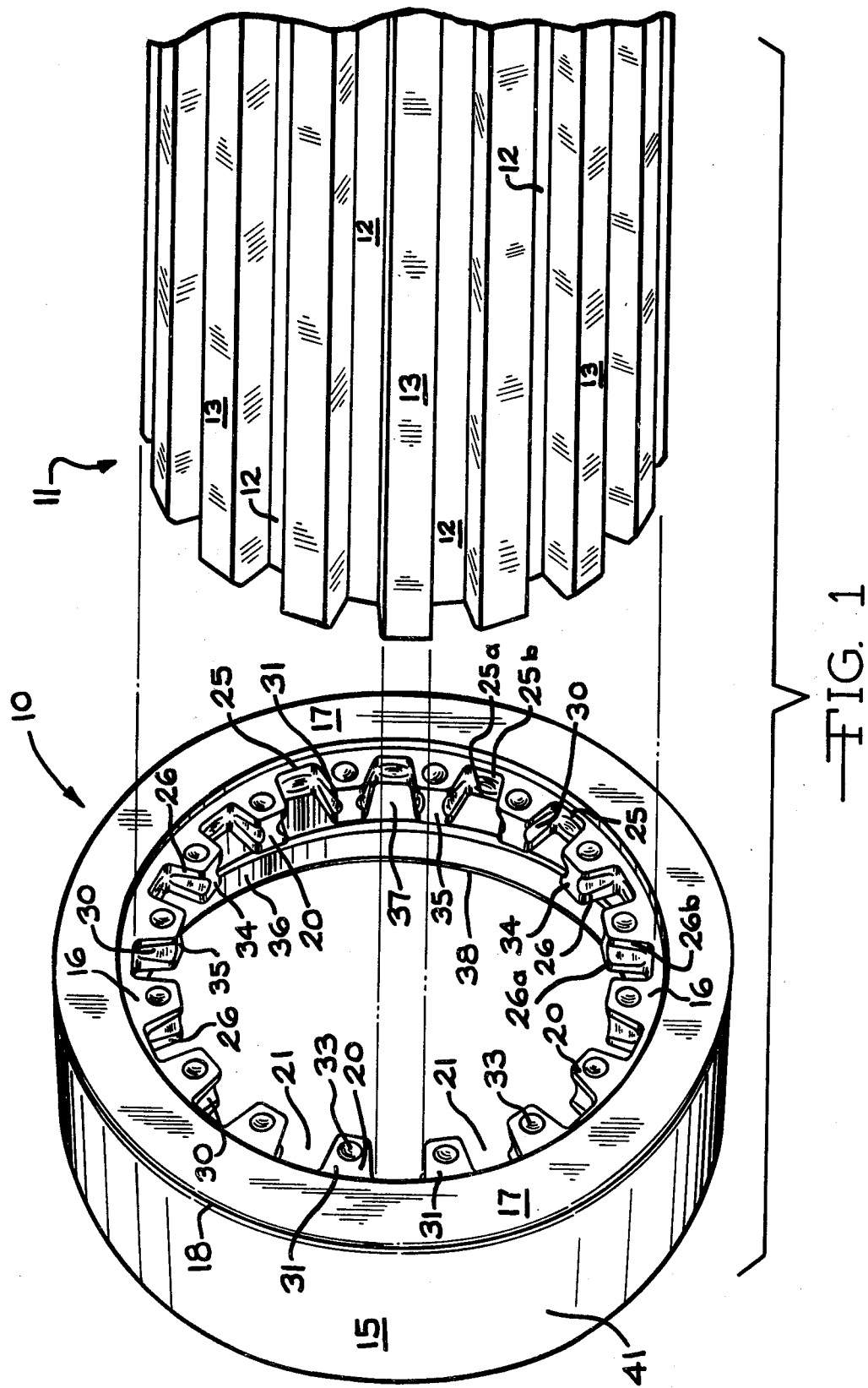
FIG. 1 is an assembly view of a preferred embodiment of a spline shaft with a seal assembly, in accordance with the present invention.

In FIG. 1 is shown generally a slip spline seal assembly 10, in accordance with the present invention, and a spline shaft 11. The shaft 11 includes alternating longitudinal grooves 12 and ribs 13 for meshing engagement with a complementary sleeve 14 (shown in FIG. 2). The ribs 13 are substantially rectangular in cross-section which, due to the overall cylindrical shape of the shaft 11, results in grooves 12 that resemble isosceles trapezoids in sectional view.

Figure 2:
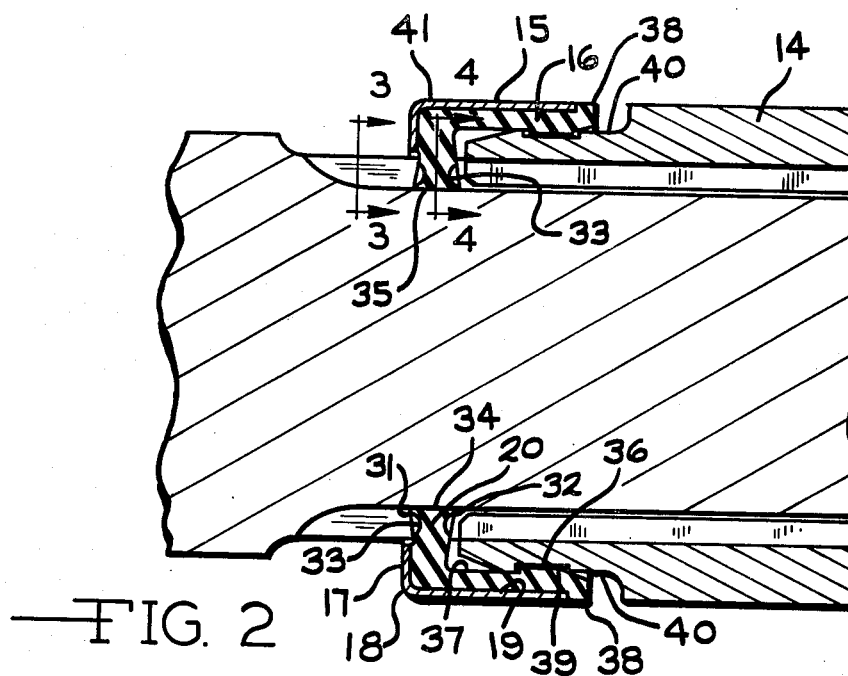
FIG. 2 is a partial sectional view of the seal assembly embodiment in FIG. 1, in position on a splined shaft and sleeve.
Figure 3:
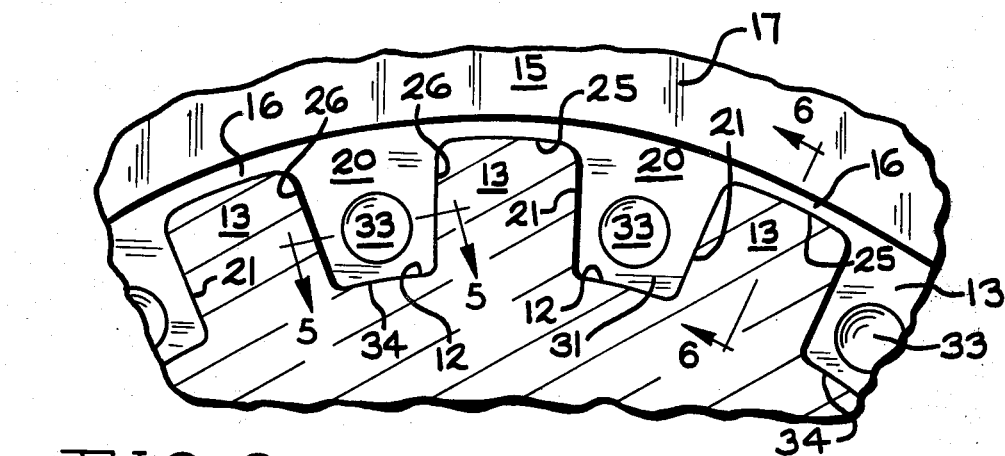
FIG. 3 is a sectional view along the lines 3—3 in FIG. 2.
Figure 4:
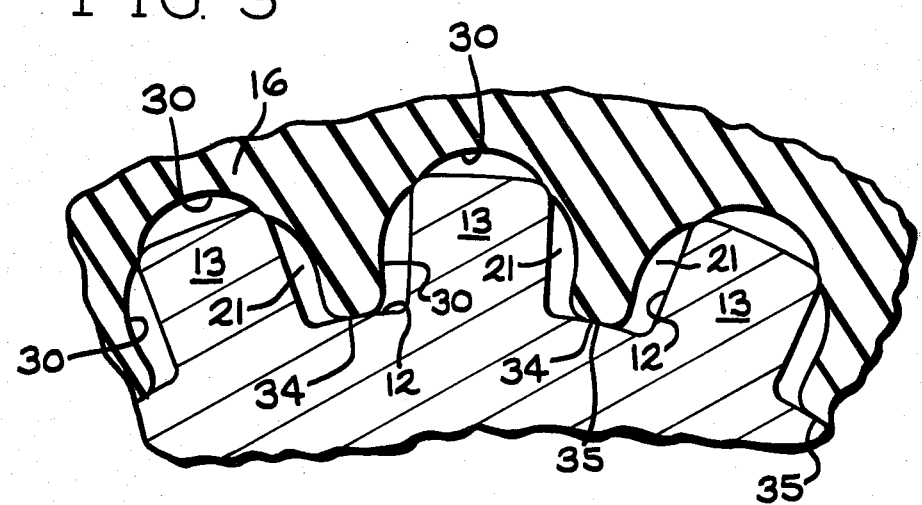
FIG. 4 is a sectional view along the line 4—4 in FIG. 2.

The seal assembly 10 comprises two major components, a cap 15 and a flexible body 16. The cap 15, also shown in FIG. 2, is cylindrical and has a circumferential and inwardly projecting flange 17 at one end 18. The flexible body 16 seats within the cap 15, contiguously with the interior bore 19 thereof, and abutting the flange 17. Adjacent the flange 17, the flexible body 16 has a circumferential inwardly directed row of alternating projections 20 and intervals 21 for splining engagement with the spline shaft 11. The body 16, or at least the projections 20, is made from resilient materials, such as rubber, nitrile, polyacrylate, or silicone compounds, which are well-known in the industry for sealing purposes. The projections 20 and intervals 21 are shown in greater detail in FIGS. 3–6.

The intervals 21 are bordered by a base 25 and opposing faces 26 of the alternating projections 20, such that they are rectangular in shape and cooperatingly mesh with the ribs 13 of the spline shaft 11. Similarly, the projections 20 are trapezoidal in radial section and cooperatingly mesh with the alternating grooves 12 of the shaft 11. The above-described meshing or spline connection then results in an effective seal around the grooves 12 and ribs 13 of the shaft 11.

Each of the faces 26 and base 25 includes a recess 30 therein, which provides a pocket for lubricating medium and an area for displacement of the flexible projections 20 when they are compressed. Without such recesses 30, the flexible projections 20 compress and bulge when the assembly 10 is fitted or slips on the shaft 11, thereby causing resistance to slipping and excessive wear and tear.

Figure 5:
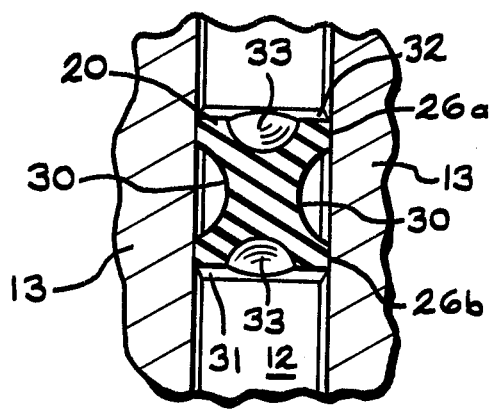
FIG. 5 is a sectional view along the line 5—5 in FIG. 3.
Figure 6:
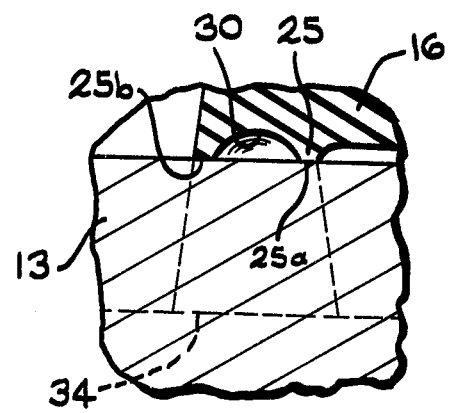
FIG. 6 is a sectional view along the lines 6—6 in FIG. 3.

The recesses 30 additionally provide the faces 26 with two separate points, 26a and 26b, of contact, and the base 25 with two separate points, 25a and 25b, of contact against the longitudinal ribs 13 of the shaft 11 (see FIGS. 5 and 6). Thus, if either contact point on a face 26 or base 25 wears, deteriorates, or otherwise fails to seal, the remaining contact point may still be effective, thereby supplying additional or back-up seal protection.

The projections 20 also include diametrically opposed upper and lower sides, 31 and 32, lying in a plane perpendicular to the longitudinal grooves 12 of the shaft 11 and having a dimple 33 within each for displacement of the projections 20 when compressed. It should be noted that, whereas the recesses 30 absorb displacement of the projections 20 primarily when compressed in the longitudinal or axial direction of the shaft 11, the dimples 33 absorb displacement primarily when the projections are compressed in the radial direction. Both means for displacement promote greater flexibility of the seal assembly 10 and a longer useful life.

The ends 34 of the projections 20 are relatively flat such that a continuous bridge 35 of material extends from the upper side 31 to the lower side 32. The bridge 35 provides structural support for the projections 20 and eliminates the existence of flappy sealing arms, described below in conjunction with the prior art embodiment of FIGS. 8–10, which tend to wear fast and break off.

The flexible body 16, in addition to the alternating projections 20 and intervals 21, has a circumferential snap ring 36 coextensive with its interior 37 and near the end 38. The snap ring 36 force fits into a complementary slot 39 about the exterior 40 of the sleeve 14, as shown in FIG. 2. Thus, as the sleeve 14 slips along the spline shaft 11, so does the entire seal assembly 10. By means then of the meshing engagement between the projections 20 and the spline shaft 11, and the force fit between the snap ring 36 and the sleeve slot 39, the spline connection between the shaft 11 and the sleeve 14 is sealed from the atmosphere. The lubricant is sealed in, and dust and other foreign contaminants are sealed out.

Figure 7:
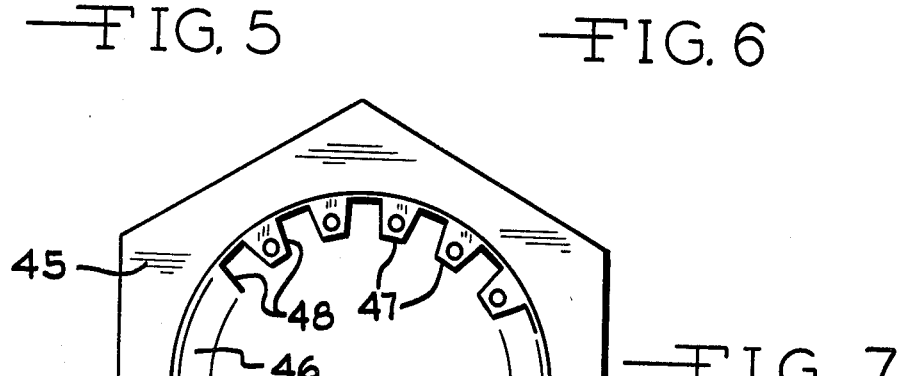
FIG. 7 is a schematic view of a second embodiment of the seal assembly of the present invention.

While the outside 41 of the cap 15 described above is cylindrical, such a shape is not critical and forms no part of the invention. Other shapes, such as hexagonal as shown in FIG. 7, may be used without departing from the scope of the present invention.

Similarly, other modifications may be made to the seal assembly as described above. For example, the embodiment in FIG. 7, also comprises generally a cap 45 and a flexible body 46 having alternating projections 47 and intervals 48. However, in this embodiment, the flexible body 46 is merely a strip of such projections 47 and intervals 48, which was formed into a ring, as exemplified by the parting line 49, and seated within the cap 45. The cap 45 itself may then include a means for locking engagement with a sleeve, rather than incorporating such means into the flexible body 46.

Figure 8:
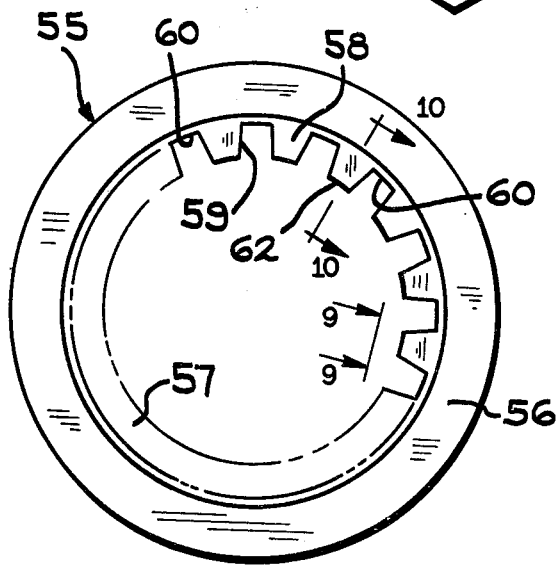
FIGS. 8–10 are schematic and sectional views of a prior art seal assembly.
Figure 10:
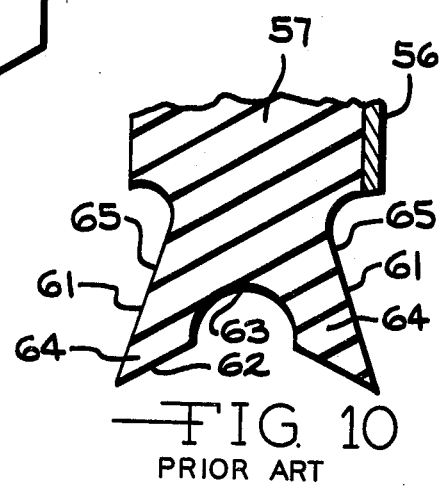
Figure 9:
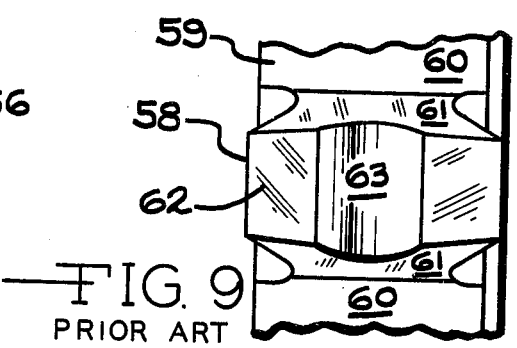

Perhaps the most pertinent prior art seal assembly 55 of which the inventor is aware is shown in FIGS. 8–10. That assembly 55 also comprises generally a cap 56 and a flexible body 57 having alternating projections 58 and intervals 59. Also, each interval 59 is bordered by a base 60 and opposing faces 61 of adjacent projections 58. However, the base 60 and opposing faces 61 of this assembly 55, which form the primary sealing surfaces with a spline shaft, are not recessed, rather they are relatively flat. Therefore, such sealing surfaces are incapable of lubrication which contributes to their destruction. In addition, those surfaces have no means for displacement of the seal material when it is compressed. The ends 62 of the projections 58, on the other hand, do include a pocket or slot 63 extending between the faces 61 of each projection 58, thereby forming two separate sealing arms 64 at the ends 62. Those sealing arms 64 bend back and forth as the assembly 55 slips along a splined shaft, eventually resulting in the arms 64 severing at the joints 65 and a broken seal. The present invention culminated from a recognition of the problems of such prior art assemblies and the discovery of simple, yet unique, modifications thereto to arrive at a non-obvious solution.

While the above preferred embodiments have been described in detail for purposes of this application, it should be obvious to persons skilled in the art that other modifications may be made without departing from the intended scope of the invention as set forth in the following claims.

What I claim is:

1. A slip spline seal assembly for shafts having alternating longitudinal grooves and ribs, said assembly comprising a flexible body having a row of alternating projections and intervals for splined and sealing engagement with such grooves and ribs, said intervals having a base and lying intermediate opposing faces of said projections, and at least one recess defined in said base or said faces providing a pocket for lubricating medium and a relief for displacement of said flexible body when compressed.

2. A slip spline seal assembly, as defined in claim 1, wherein said base and each of said faces has a recess for such lubricating medium and such body displacement.

3. A slip spline seal assembly, as defined in claim 1, said projections further including diametrically opposed upper and lower sides, said sides lying in a plane perpendicular to such longitudinal grooves and having at least one dimple therein for displacement of said flexible body when compressed.

4. A slip spline seal assembly, as defined in claim 1, said assembly further including a cap having a cylindrical bore and first and second ends, said first end having a circumferential and inwardly projecting flange, and said flexible body contiguously seating within said cap and abutting said flange such that such shaft passes through said flexible body and said cap.

5. A slip spline seal assembly, as defined in claim 4, wherein such shafts are splined to an external sleeve, said assembly having means for interlocking with said sleeve such that said cap and such sleeve cooperatingly slip along such shaft.

6. A slip spline seal assembly for shafts having alternating longitudinal grooves and ribs and being splined to an external sleeve, said assembly comprising a cap having a cylindrical bore and first and second ends, said cap first end having a circumferential and inwardly projecting flange, a flexible body having first and second ends and contiguously seated within said bore such that said body first end abuts said flange, said body having an inwardly directed row of alternating projections and intervals at said body first end for splined and sealing engagement with such grooves and ribs, said intervals having a base and lying intermediate opposing faces of said projections, at least one recess in said base or said faces to provide a pocket for lubricating medium and a relief for displacement of said flexible body when compressed, and said body having means near said second end for interlocking with such sleeve such that said assembly and such sleeve cooperatingly slip along such shaft.

7. A slip spline seal assembly, as defined in claim 6, wherein said base and each of said faces has a recess for such lubricating medium and such body displacement.

8. A slip spline seal assembly, as defined in claim 6, said projections further including diametrically opposed upper and lower sides, said sides lying in a plane perpendicular to such longitudinal grooves and having at least one dimple therein for displacement of said flexible body when compressed.

* * * * *